(12) United States Patent
Jain et al.

(10) Patent No.: US 9,083,613 B2
(45) Date of Patent: Jul. 14, 2015

(54) DETECTION OF CABLING ERROR IN COMMUNICATION NETWORK

(71) Applicant: CISCO TECHNOLOGY, INC., San Jose, CA (US)

(72) Inventors: Vipin Jain, San Jose, CA (US); Govind Prasad Sharma, Union City, CA (US); Dhananjaya Rao, Milpitas, CA (US); Herman Levenson, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 306 days.

(21) Appl. No.: 13/653,129

(22) Filed: Oct. 16, 2012

(65) Prior Publication Data

US 2014/0105029 A1    Apr. 17, 2014

(51) Int. Cl.
*H04L 12/26* (2006.01)
*H04L 12/24* (2006.01)

(52) U.S. Cl.
CPC ............ *H04L 43/0811* (2013.01); *H04L 43/10* (2013.01); *H04L 41/12* (2013.01); *Y02B 60/43* (2013.01)

(58) Field of Classification Search
CPC ...... H04L 43/0811; H04L 43/10; H04L 41/12
USPC .......................... 370/241, 242, 244, 252, 248
See application file for complete search history.

(56) References Cited

U.S. PATENT DOCUMENTS

| 6,735,198 | B1 | 5/2004 | Edsall et al. | |
|---|---|---|---|---|
| 7,975,180 | B2 | 7/2011 | Sajassi et al. | |
| 8,107,396 | B1 | 1/2012 | Sharma | |
| 8,191,099 | B2 | 5/2012 | Johnson et al. | |
| 2003/0137934 | A1* | 7/2003 | Schaller et al. | 370/227 |
| 2012/0016981 | A1* | 1/2012 | Clemm et al. | 709/224 |

* cited by examiner

*Primary Examiner* — Un Cho
*Assistant Examiner* — Siming Liu
(74) *Attorney, Agent, or Firm* — Cindy Kaplan

(57) ABSTRACT

In one embodiment, a method at a network device includes receiving a link layer advertisement, comparing information in the link layer advertisement with connectivity information stored at the network device, and based on the comparison, determining if there is a cabling error between the network device and a link peer transmitting the link layer advertisement. An apparatus and logic are also disclosed herein.

20 Claims, 4 Drawing Sheets

DETECTION OF CABLING ERROR IN COMMUNICATION NETWORK

TECHNICAL FIELD

The present disclosure relates generally to communication networks, and more particularly, to detection of cabling errors in communication networks.

BACKGROUND

Data center networks are rapidly evolving. Cabling problems in highly meshed data center networks with a large number of switches, and other smaller networks, are often difficult to troubleshoot and may lead to network downtime and increased operational costs.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
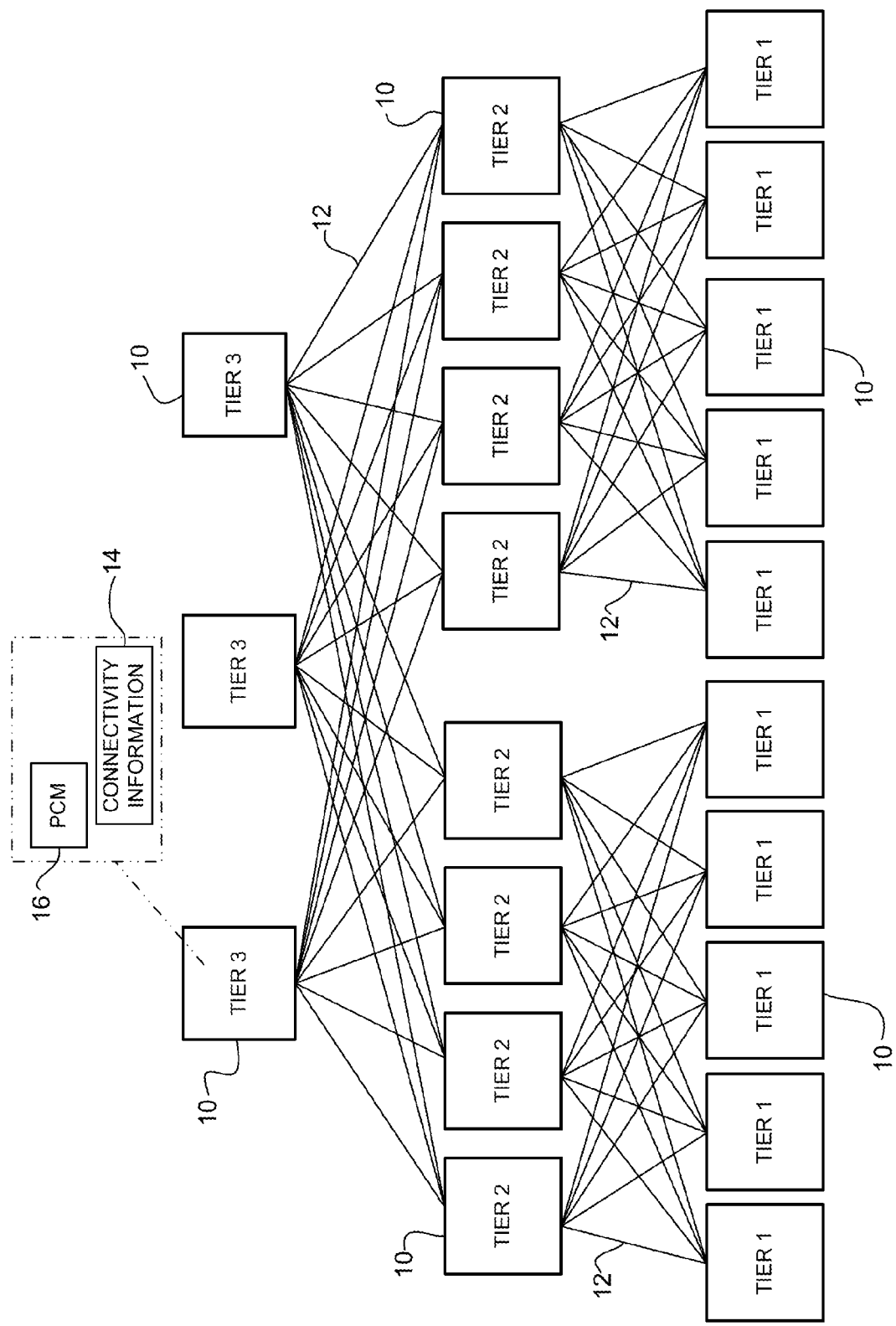
FIG. 1 illustrates an example of a network in which embodiments described herein may be implemented.

In one embodiment, a method at a network device generally comprises receiving a link layer advertisement, comparing information in the link layer advertisement with connectivity information stored at the network device, and based on the comparison, determining if there is a cabling error between the network device and a link peer transmitting the link layer advertisement.

In another embodiment, an apparatus generally comprises a processor for processing a link layer advertisement from a link peer, comparing information in the link layer advertisement with connectivity information stored at the apparatus, and based on the comparison, determining if there is a cabling error between the apparatus and the link peer transmitting the link layer advertisement. The apparatus further comprises memory for storing the connectivity information.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Many enterprise and service provider customers are building private or public clouds. Cloud computing enables network access to a shared pool of configurable resources that can be rapidly provisioned and released with minimum management effort. Due to the success of cloud deployments, many network requirements are changing. For example, Clos based network designs are changing to address cloud requirements for use in next generation fabric architectures. Clos networks are multistage switching networks, which provide benefits such as the availability of equal cost multipath based switching fabric, use of simplified and lower port density core network switches, and a fully utilized link bandwidth on each network node. The Clos design also allows the networks to scale and grow incrementally on demand.

The network switches in a Clos network fabric are organized into two or more stages. The lowest level stage (referred to as a leaf, ingress, or egress stage) provides network connectivity to the end hosts and implements layer 2 bridging and/or layer 3 routing functions. The next higher level stage (referred to as a spine or middle stage) provides redundant paths and connectivity from an ingress stage switch in the network fabric to an egress stage switch. In accordance with Clos network design rules, each switch in a stage is connected to all switches in the adjacent higher level stage and lower level stage only once.

In data centers, customers often use network planning tools to prepare and generate cable plans and use them as a basis to interconnect devices in traditional or Clos based networks. Even though connections are made per the administrator prepared cable plan, it is possible that cabling problems can occur due to human error, since technicians are dealing with thousands of cable connections.

In highly meshed data center networks with thousands of switches, miscabling can be a pragmatic problem leading to difficult troubleshooting without adequate support.

The embodiments described herein provide methods and apparatus to automatically detect cabling errors that may be caused by human error. The embodiments may be used, for example, to take preventive action upon detection of a cabling error in highly meshed data center networks. Two example embodiments that allow for automatic detection of miscabling between link peers in the network fabric are described below. One embodiment is based on tier level checks and another is based on a user defined cable plan. The embodiments provide for faster troubleshooting of network issues due to miscabling and therefore reduce network downtime and operational costs. In one or more embodiments, a neighbor cache with link layer connectivity details may be maintained for use in monitoring of network topology by management applications.

Referring now to the drawings, and first to FIG. 1, an example of a network in which the embodiments described herein may be implemented is shown. The network may be configured for use as a data center or any other type of network. The example shown in FIG. 1 illustrates a Clos network topology comprising a plurality of network devices 10. The network devices 10 may be layer 2 (L2), layer 3 (L3), or L2/L3 switching devices or other network devices configured to perform forwarding functions. The network devices 10 may be, for example, a NEXUS 3000, 5000, or 7000 series switch available from Cisco Systems, Inc. of San Jose, Calif. It is to be understood that these are only examples of network devices that may be used to implement the embodiments described herein.

In one embodiment, the network devices 10 are assigned a Clos tier level. In the example shown in FIG. 1, the switches 10 are assigned tier level 1, 2, or 3. The level 1 switches are edge switches that provide connectivity to data center servers (not shown). The level 2 and 3 (and above) switches are spine switches, which provide a hierarchical network fabric connectivity topology.

An inter-switch link (ISL) 12 is used to connect adjacent Clos tier level switches 10. Per Clos network design, the inter-switch link 12 of a switch 10 is only connected to its adjacent Clos stage switches. This means that a tier level 1 switch is only connected to tier level 2 switches, a tier level 2 switch is only connected to tier level 3 or tier level 1 switches, and so on. Adjacent peers (neighbors) connected by the inter-switch link 12 are referred to herein as link peers.

As described in detail below, network device 10 includes connectivity information 14 and a physical connectivity manager (PCM) 16 configured to check for cabling errors based on the connectivity information. For simplification, the connectivity information 14 and PCM 16 are shown for only one node in FIG. 1. Any number of network devices (e.g., two network devices, group of network devices, all stage devices) may comprise connectivity information 14 and physical connectivity manager 16 for use in performing cabling checks.

In a first embodiment, the connectivity information 14 comprises tier level information for the local network device. The physical connectivity manager 16 compares the local tier level to the link peer tier level received from the link peers to determine if a cabling error exists. In a second embodiment, the connectivity information 14 comprises link information (e.g., local chassis identifier, local port identifier, remote chassis identifier, remote port identifier) representing physical connections between the network device and link peer according to a cable plan. The physical connectivity manager 16 compares the cable plan to link information received from the link's peer device to determine if there is a cabling mismatch.

The tier level or link information received from the link peer may be transmitted in a link layer advertisement such as a Link Layer Discovery Protocol (LLDP) message, Cisco Discovery Protocol (CDP) message, or other suitable link layer protocol message. If a cabling error is identified by the physical connectivity manager 16, appropriate action may be taken, including for example, logging a cabling error or not bringing up the adjacency, as described further below.

Each network device 10 may also maintain a cache (e.g., neighbor cache) of discovered link peers for each local port at the switch. The cache may include information such as local port-id, remote chassis-id, remote port-id, remote tier level, and the cabling validation state. This information may be used, for example, by management applications for monitoring link peers and their connectivity states from the switch.

It is to be understood that the network shown in FIG. 1 and described herein is only an example and that the embodiments described herein may be implemented in networks having different network topologies and network devices, without departing from the scope of the embodiments. For example, the second embodiment described herein is based on cross validating the discovered remote link information against an administrator prepared cable plan, and is not specific to a Clos network. Therefore, the second embodiment may be implemented in non-Clos networks that are smaller and/or non-meshed topologies as well as Clos networks.

Figure 2:
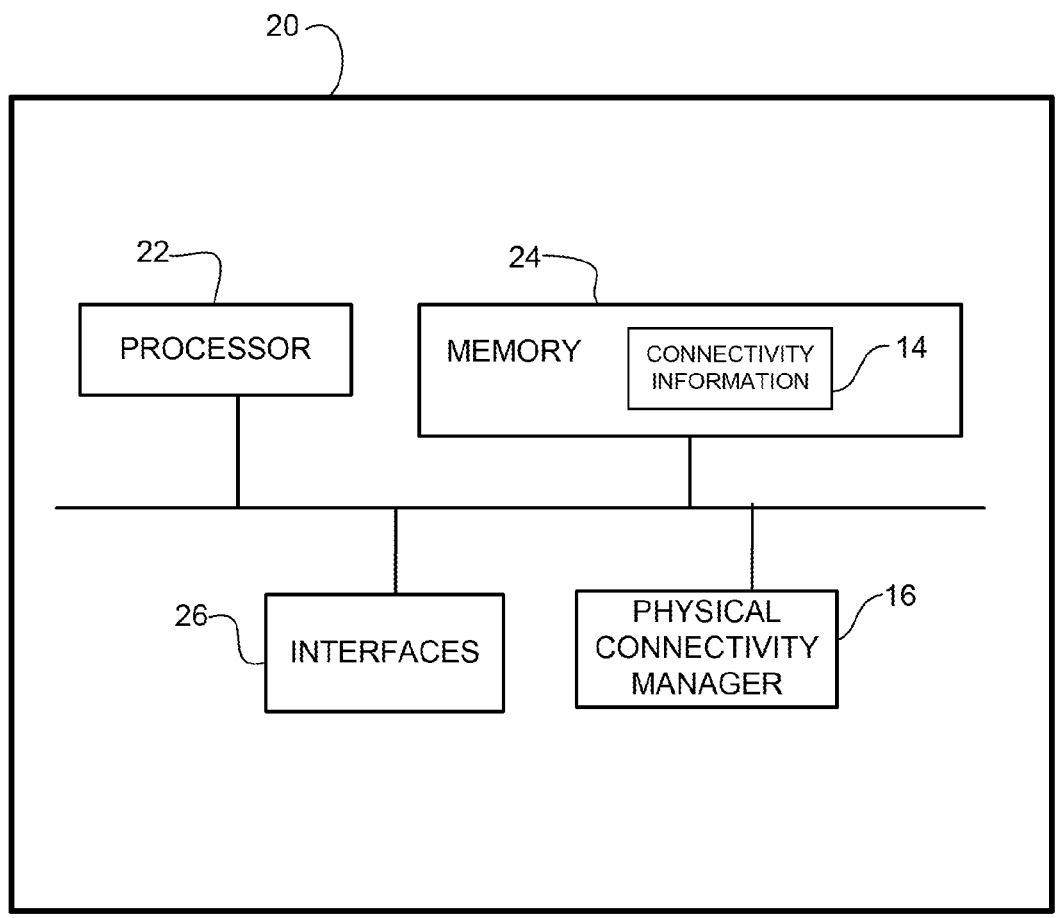
FIG. 2 depicts an example of a network device useful in implementing embodiments described herein.

An example of a network device (e.g., switch) 20 that may be used to implement embodiments described herein is shown in FIG. 2. In one embodiment, network device 20 is a programmable machine that may be implemented in hardware, software, or any combination thereof. The device 20 includes one or more processor 22, memory 24, network interface 26, and physical connectivity manager (miscabling detection module) 16.

Memory 24 may be a volatile memory or non-volatile storage, which stores various applications, modules, and data for execution and use by the processor 22. For example, memory 24 may store connectivity information 14 (e.g., local tier level, link information from cable plan). The connectivity information 14 may also include remote link peer information received from link peers and validation states based on physical connectivity manager 16 cabling checks. For example, memory 24 may maintain per local port-id, the connected link peer's chassis-id, port-id, tier level (for first embodiment), and the cabling validation state in a local database, once link information is received from a link peer and a cabling check is performed. The connectivity information 14 may be stored in cache or any other data structure. The cache may rely on link layer advertisements received from link peers to refresh connection entries. The entries may be purged if no new information is received from the link peer for a specified amount of time.

Logic may be encoded in one or more tangible computer readable media for execution by the processor 22. For example, the processor 22 may execute codes stored in a computer readable medium such as memory 24. The computer readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interfaces 26 may comprise any number of interfaces (linecards, ports) for receiving data or transmitting data to other devices. The interface 26 may include, for example, an Ethernet interface for connection to a computer or network.

The physical connectivity manager 16 may comprise code stored in memory 24, for example. As described in detail below, the physical connectivity manager 16 is used to compare tier level or link information received from link peers with connectivity information 14 stored at the network device 20 to identify cabling errors. The remote tier level, remote chassis-id, and remote port-id are extracted from the link layer advertisement and used by physical connectivity manager 16 to identify cabling errors. The physical connectivity manager 16 may be used, for example, to detect connectivity inconsistencies, provide alerts, and take corrective action.

The network device 20 may also include an interface (e.g., module, plugin library, application programming interface) (not shown) interposed between a link layer service module (not shown) and the physical connectivity manager 16 for extracting connectivity information from the link layer advertisements and providing the connectivity information to the physical connectivity manager.

It is to be understood that the network device 20 shown in FIG. 2 and described above is only an example and that network devices having different components and configurations may be used without departing from the scope of the embodiments. For example, the network device 20 may include any suitable combination of hardware, software, algorithms, processors, devices, components, or elements operable to facilitate the capabilities described herein.

The first embodiment, which uses tier level based checks, is described below, followed by a description of the second embodiment, which uses cable plan based checks for identifying cabling errors.

As previously described and shown in FIG. 1, each stage of the Clos network fabric is assigned and represented by a sequential number known as a tier level number. Every switch 10 in a stage is associated with the corresponding tier level number assigned to the stage that the switch is in. In one example, all of the leaf switches (in the lowest level Clos stage) are provisioned with a tier level value of 1, the next higher level stage switches (first stage of spine switches) are provisioned with a tier level of 2, and the next higher stage switches (second stage of spine switches) are provisioned with a tier level of 3, and so on. It is to be understood that this numbering scheme is only an example, and other numbering schemes may be used.

The switch 10 may be assigned a default switch configuration downloaded on boot up. The tier level number of the switches may be provisioned, for example, using a global configuration command, which can be made available via the switch startup configuration or via switch boot up configuration from power on auto provisioning, for example.

Each switch 10 in the network that is configured with a tier level, advertises its tier level number to its link peers. In one embodiment, the switch 10 advertises its tier level as part of the link layer PDUs (protocol data units), along with the chassis identifier (chassis-id) and physical port identifier (port-id). Examples of link layer advertisements that may be used to transmit tier level information are described further below. Adjacent switches may, for example, exchange their tier level numbers and switch identifiers (chassis-id) when an inter-switch link 12 is coming up. The switches may also exchange tier levels periodically or upon the occurrence of an event (e.g., change in switch or network configuration).

Figure 3:
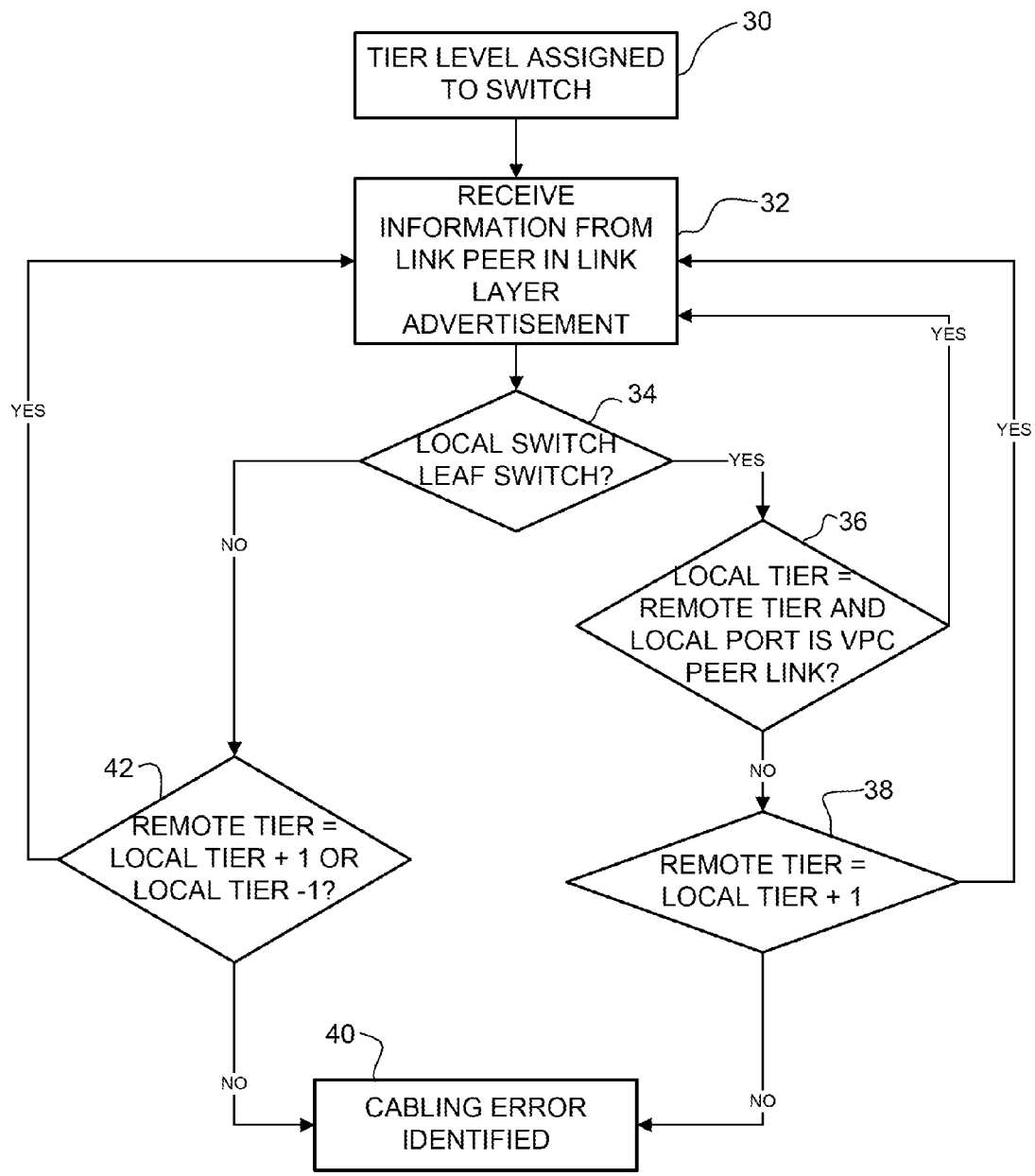
FIG. 3 is a flowchart illustrating a process for detecting cabling errors using tier level checks, in accordance with one embodiment.

FIG. 3 is a flowchart illustrating an overview of a tier-based connectivity check process for use in detecting cabling errors, in accordance with the first embodiment. At step 30, a tier level is assigned to a network device (e.g., local switch) 10. The switch 10 stores the local tier level (connectivity information 14) and advertises its tier level to its link peers. The switch 10 also receives tier level information from its link peers (step 32). The tier level information is received in a link layer advertisement (e.g., LLDP, CDP message), which may include, for example, chassis-id, port-id, and tier level of link peer. The local switch 10 compares the link peer (remote) tier level information received in the link layer advertisement with the local tier level (connectivity information stored at the switch) and based on the comparison, determines if there is a cabling error between the local switch and the link peer that transmitted the link layer advertisement, as described below The local switch 10 (receiver of the link layer advertisement) performs different checks to validate link connections with the link peer (sender of the link layer advertisement) based on whether the local switch is a leaf switch or a spine switch. If the local switch is a leaf switch (e.g., local switch tier level is equal to 1 in the example shown in FIG. 1), the PCM 16 first checks to see if the local tier level is the same as the remote switch (link peer) tier level (steps 34 and 36). If the local and remote tier levels are the same, there is an exception to the general rule that the leaf switches are connected only to spine switches in the next tier level, for virtual port channels (vPCs). Virtual port channels may be used, for example, to provide redundancy at the leaf level to servers. Therefore, the vPC peer links (also known as multi-chassis trunks) are allowed to exist between the leaf switches. The switch may use, for example, an MCECM (Multi-Chassis Ether Channel Manager) or port channel manager to determine if a local port is part of a vPC peer link. If the receiving link is a virtual port channel peer link, a physical connection with a peer link having a remote tier level of one (same as local switch) is allowed (step 36). In this case, the process returns to step 32 and the switch 10 awaits link information from a link peer.

The tier level advertisement and check is a link level check, rather than a device level check. The vPC described above is an example of a case where those checks for links on leaf nodes are relaxed with respect to the tier level check. There may also be other cases in which checks are relaxed and a cabling error is not identified for predetermined specified types of links, which are excluded from tier level checks. For example, a leaf node at tier 1 may connect to tier 3 spine nodes. Thus, there may be one or more specific exemptions, as described above for the vPC case.

If the local tier level of the leaf switch and the remote link peer tier level are different, a check is then performed at the leaf node to determine if the remote tier level is an adjacent tier level (remote tier level=local tier level+1) (step 38). If the link peer passes this check, the process returns to step 32. An entry in the neighbor cache table at the local switch may be updated based on the check, or a new entry may be created if this was the first check at the local switch for this connection. For example, for secure inter-switch port connections that have passed cabling validation checks, the cache preferably maintains for the local port-id (on which tier level advertisement is received), the remote tier level, remote chassis-id, and remote port-id. The cache entries may be refreshed upon receipt of link layer advertisements from link peers that contain the tier level. If a new port index is received, a new entry is created in the cache. The cache entries may also be purged if no link layer advertisement is received from a link peer before a user configured hold timeout expires or if the link peer stops sending the tier level.

If the tier level check at the leaf node performed at step 38 does not pass (remote tier level≠local tier level+1), a cabling error is identified (step 40). In this case the link adjacency is not brought up and a cabling mismatch error is logged. The logged error may include, for example, details about the local switch and peer (remote) switch, such as the local chassis-id, local port-id, local tier level, peer chassis-id, peer port-id, and peer tier level. It is to be understood that this is only an example, and that additional information, less information, or different information may be provided in the error log. Also, other actions may be performed in response to a miscabling determination. For example, a second check may be performed before disabling the inter-switch link port, and the port disabled only after the second check has identified a cabling error. A message may also be sent to a user to provide a chance for the user to correct a tier level misconfiguration, for example, before the port is disabled. Other action that may be taken when a cabling error is identified includes: transmitting an SNMP (Simple Network Management Protocol) trap notification to the network management system; or invocation of a local script to handle a customized reaction to the error.

If the local switch is a spine switch (e.g., local switch tier level >1 in the example of FIG. 1) (step 34), a check is performed to see if the link layer advertisement was received from a link peer in an adjacent tier (remote tier level=local tier level+1 or local tier level−1) (step 42). For example, if the switch is in tier level 2, link layer advertisements should only be received from switches in tier level 1 or tier level 3. If the tier level check passes, the process returns to step 32. As described above, the corresponding entry in the neighbor cache may be updated or a new entry created. If the tier level check fails, a cabling error is identified (step 40). As described above, the link adjacency may not be brought up, a cabling mismatch error may be logged, or both of these actions or other actions may be performed in response to the miscabling detection.

The following provides an example of an extension to an existing link layer discovery protocol to allow for the exchange of tier level information for the first embodiment described above. It is to be understood that the following is only an example and that other extensions, formats, or fields may be used to exchange tier level information in any link layer control protocol exchange, without departing from the scope of the embodiments.

In one example, LLDP is used with extensions that allow for exchange of Clos tier level information. The protocol is designed to allow network devices to introduce new organizationally specific attributes and optionally transmit and receive them in addition to the mandatory standard TLVs as part of the LLDP PDUs. The LLDP PDU includes a chassis ID, port ID, time-to-live, and end of LLDP PDU TLVs along with optional TLVs. One optional TLV is an organizationally specific TLV. In one example, a new organizationally specific TLV subtype is used under existing LLDP_ORG_CISCO_TLV_OUI (hex 00-01-42) (Cisco's reserved OUI for organizationally specific TLVs) to allow for exchange of the Clos tier level with adjacent link partners. The following is one example of an organizationally specific Clos tier level TLV:

```
+++++++++++++++++++++++++++++++++++++++++++++++++++++++++++++++++++
| TLV Type  | TLV Information |    OUI    | Tier Level    | Tier Level |
|           | String Length   |           | TLV Subtype   |            |
+++++++++++++++++++++++++++++++++++++++++++++++++++++++++++++++++++
```

The TLV Type and TLV Information fields make up the TLV header. The organizationally specific OUI, Tier Level Subtype, and Tier Level make up the TLV information string. The following describes field formats and content, in accordance with one embodiment:

TLV Type (7 bits)=127 (LLDP Organizationally Specific TLV type)

TLV Information String Length (9 bits)=5 (Length in octets of OUI, Subtype and the Information String field of the TLV)

OUI (3 octets)=0x00-01-42 (Cisco reserved LLDP OUI)

Organizationally defined subtype (1 octet)=4 (Tier Level Subtype)

Organizationally defined information string (1 octet)=Tier level of the sender device (0 to 255).

Once the switch 10 is assigned a tier level, the switch can create TLV data structures in LLDP memory for all LLDP interfaces and transmit the tier level TLV on the LLDP interfaces. The tier level TLV data structures in LLDP memory are updated following a tier level configuration change, in which case the new tier level TLV is transmitted to link peers. The tier level configuration may also be disabled for system maintenance so that tier level checks are temporarily stopped for one or more switches and link peers in the network.

The first embodiment described above performs connectivity checks at a local switch by comparing the local switch tier level (connectivity information stored at the local switch) with link peer tier level information received in a link layer advertisement from the link peer. The second embodiment performs connectivity checks by comparing link information from a cable plan (connectivity information stored at the local switch) with link peer information received in a link layer advertisement from the link peer. Details of the second embodiment are described below.

Network planning tools are often used to prepare and generate cable plans, which are used to interconnect devices in traditional or Clos based data centers. The cable plan specifies the ports at a switch that should be connected to remote switches and the ports at the remote switches (e.g., port 1 of local switch connected to port 25 of spine switch 3, port 5 of local switch connected to port 7 of spine switch 7, etc.). When the inter-switch link 12 comes up, the switch uses information received from the link peers to validate that the link is connected as specified in the cable plan and identify any cabling errors. The following describes an example of the second embodiment that can be used to detect cabling errors in runtime, raise alerts, and take preventive action.

Link information from the cable plan may be imported on the network device 10 and stored in a local cache (e.g., connectivity information 14 in FIG. 1). The imported cable plan may be stored as a table, with each entry representing a physical connection between a local switch port and a remote device port. In one example, each entry includes a local chassis-id, local port-id, remote chassis-id, and remote port-id.

Figure 4:
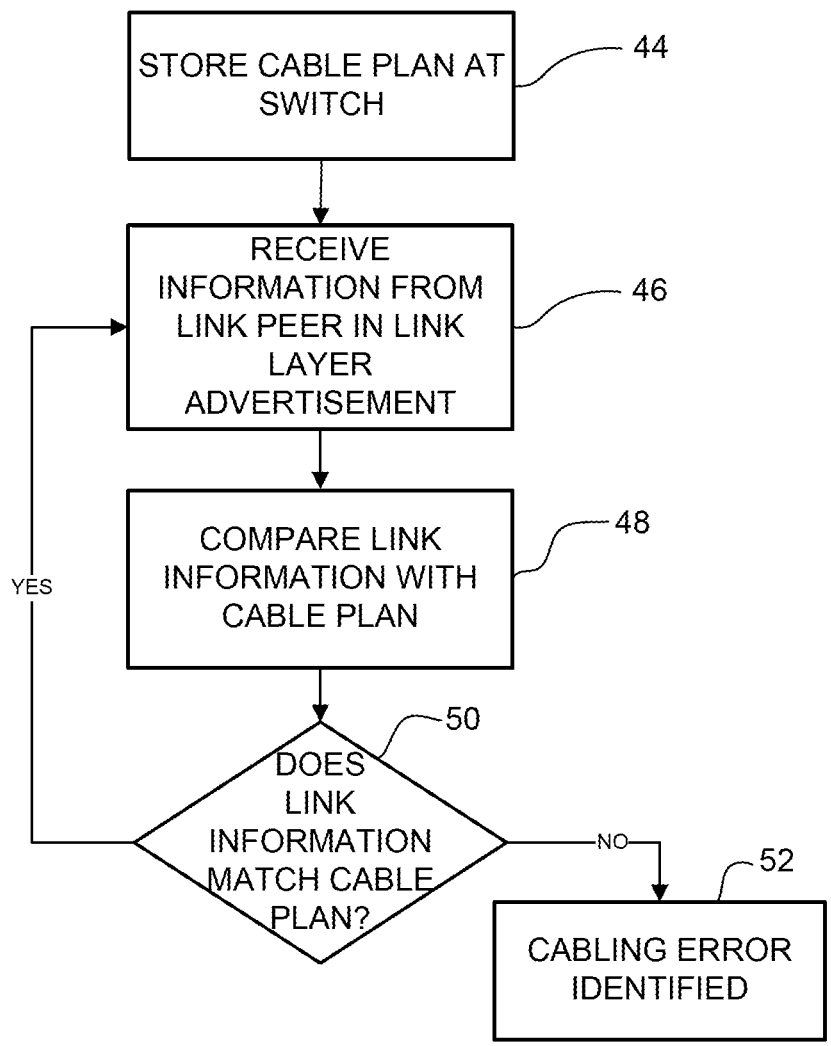
FIG. 4 is a flowchart illustrating a process for detecting cabling errors using a cable plan, in accordance with another embodiment.

FIG. 4 is a flowchart illustrating an overview of a process for detecting a cabling error based on a cable plan, in accordance with the second embodiment. At step 44, the local switch 10 stores the cable plan (e.g., relevant link information for local switch) in its memory. As described above, the cable plan may be stored in a local cache with entries for each physical connection between the local network device and remote link peers. The physical connectivity manager 16 listens for link layer advertisements received from link peers (step 46). The received advertisements include the chassis-id and port-id for the remote switch link. For each advertisement received from a peer on a local port, the physical connectivity manager 16 compares the advertised remote chassis-id and the remote port-id of the link peer against the corresponding connection entry in the cable plan for the local port (step 48). If there is a match (step 50), the local switch 10 continues to monitor received advertisements and compare the link peer information in the advertisement with the stored cable plan. If the received link information does not match the stored cable plan, a cabling error is identified (steps 50 and 52). As described above for the first embodiment, if a cabling error is identified, the link adjacency is not brought up and a cabling mismatch error is logged. Other action may be taken including transmitting an SNMP trap message or script invocation, as previously discussed. In one embodiment, if there is not a match between the received link information and the cable plan, the switch may wait until another link layer advertisement is received and perform another check, before identifying a cable error. The switch may also check to see if there is an updated cable plan available and if so, after the cable plan is reloaded, another check is performed against the updated cable plan, before a cabling error is identified.

The cabling error checks described above may be a one-time check performed after the physical link comes up or a continuous check performed every time remote information is received from the peer, for example.

As previously discussed, the cable plan based miscabling detection embodiment is not specific to Clos networks and can also be used for non-Clos network topologies in data centers or other networks.

It is to be understood that the processes illustrated in FIGS. 3 and 4, and described above are only examples and that steps may be modified, added, or combined, without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method at a network device comprising:
receiving a link layer advertisement;
comparing information in said link layer advertisement with connectivity information stored at the network device; and
based on said comparison, determining if there is a cabling error between the network device and a link peer transmitting said link layer advertisement;
wherein said connectivity information comprises a tier level for the network device and comparing said information comprises comparing a tier level for the link peer received in said link layer advertisement with said tier level for the network device.

2. The method of claim 1 wherein the network device comprises a switch in a Clos network.

3. The method of claim 1 wherein the network device comprises a leaf switch and further comprising identifying a cabling error if said tier level of the link peer is not equal to said tier level of the leaf switch plus one.

4. The method of claim 3 wherein a cabling error is not identified for predetermined specified types of links excluded from tier level checks.

5. The method of claim 1 wherein the network device comprises a spine switch and further comprising identifying a cabling error if said tier level of the link peer is not equal to said tier level of the spine switch plus one or minus one.

6. The method of claim 1 wherein said information in said link layer advertisement comprises a tier level, a chassis identifier, and a port identifier for the link peer.

7. The method of claim 1 wherein said connectivity information comprises link information from a cable plan and said link layer advertisement information comprises a chassis identifier and a port identifier for the link peer.

8. The method of claim 7 further comprising storing the link information at the network device in a table comprising an entry corresponding to a physical connection between the network device and the link peer.

9. The method of claim 7 wherein the link information comprises a local chassis identifier and local port identifier for the network device, and a remote chassis identifier and remote port identifier for the link peer according to the cable plan.

10. The method of claim 1 wherein receiving a link layer advertisement comprises receiving a LLDP (Link Layer Discovery Protocol) message.

11. The method of claim 1 wherein receiving a link layer advertisement comprises receiving a CDP (Cisco Discovery Protocol) message.

12. An apparatus comprising
a processor for processing a link layer advertisement, comparing information in said link layer advertisement with connectivity information stored at the apparatus, and based on said comparison, determining if there is a cabling error between the apparatus and a link peer transmitting said link layer advertisement; and
memory for storing said connectivity information;
wherein said connectivity information comprises a tier level for the apparatus and comparing said information comprises comparing a tier level for the link peer with said tier level of the apparatus.

13. The apparatus of claim 12 wherein the apparatus comprises a switch configured for operation in a Clos network.

14. The apparatus of claim 12 wherein the processor is further configured, upon identifying a cabling error, to initiate one or more actions selected from a group comprising: disabling a link between the apparatus and the link peer; logging an error; transmitting an SNMP (Simple Network Management Protocol) trap notification; script invocation; and reloading a cable plan.

15. The apparatus of claim 12 wherein said connectivity information comprises link information from a cable plan and said information in said link layer advertisement comprises a chassis identifier and a port identifier for the link peer.

16. Logic encoded on one or more non-transitory computer readable media for execution and when executed operable to:
compare information received in a link layer advertisement with connectivity information stored at a network device; and
based on said comparison, determine if there is a cabling error between the network device and a link peer transmitting said link layer advertisement;
wherein said connectivity information comprises a tier level for the network device and comparing said information comprises comparing a tier level for the link peer with said tier level for the network device.

17. The logic of claim 16 wherein said connectivity information comprises link information from a cable plan and said information in said link layer advertisement comprises a chassis identifier and a port identifier for the link peer.

18. The logic of claim 16 wherein the network device comprises a leaf switch and wherein the logic is operable to identify a cabling error if said tier level of the link peer is not equal to said tier level of the leaf switch plus one.

19. The logic of claim 16 wherein a cabling error is not identified for predetermined specified types of links excluded from tier level checks.

20. The logic of claim 16 wherein the network device comprises a spine switch and the logic is operable to identify a cabling error if said tier level of the link peer is not equal to said tier level of the spine switch plus one or minus one.

* * * * *